United States Patent
Tamemasa et al.

(10) Patent No.: US 9,239,555 B2
(45) Date of Patent: Jan. 19, 2016

(54) METHOD FOR MANUFACTURING SHEET HEATING ELEMENT, FIXING DEVICE, AND IMAGE FORMING APPARATUS

(71) Applicant: FUJI XEROX CO., LTD., Tokyo (JP)

(72) Inventors: Hiroshi Tamemasa, Kanagawa (JP); Mitsuru Sato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 3 days.

(21) Appl. No.: 13/891,907

(22) Filed: May 10, 2013

(65) Prior Publication Data

US 2014/0178114 A1    Jun. 26, 2014

(30) Foreign Application Priority Data

Dec. 21, 2012 (JP) ................. 2012-279455

(51) Int. Cl.
| | |
|---|---|
| *G03G 15/20* | (2006.01) |
| *B32B 15/01* | (2006.01) |
| *C25D 11/18* | (2006.01) |
| *C25D 11/26* | (2006.01) |
| *H05B 3/34* | (2006.01) |
| *C25D 11/02* | (2006.01) |
| *H05B 3/00* | (2006.01) |
| *C25D 11/08* | (2006.01) |
| *C25D 11/10* | (2006.01) |

(52) U.S. Cl.
CPC .......... *G03G 15/2053* (2013.01); *B32B 15/017* (2013.01); *C25D 11/022* (2013.01); *C25D 11/18* (2013.01); *C25D 11/26* (2013.01); *G03G 15/2057* (2013.01); *H05B 3/0095* (2013.01); *H05B 3/34* (2013.01); *C25D 11/08* (2013.01); *C25D 11/10* (2013.01); *H05B 2203/017* (2013.01)

(58) Field of Classification Search
CPC .......... G03G 15/2053; G03G 15/2089; H05B 6/145; H05B 2203/017; C25D 11/08; C25D 11/10
USPC ........................................................ 399/330
See application file for complete search history.

(56) References Cited

U.S. PATENT DOCUMENTS

| | | | |
|---|---|---|---|
| 2004/0238527 A1 | 12/2004 | Ozawa et al. | |
| 2009/0256154 A1 | 10/2009 | Lee et al. | |

FOREIGN PATENT DOCUMENTS

| | | | |
|---|---|---|---|
| JP | A-8-180962 | 7/1996 | |
| JP | 09197880 A | * 7/1997 | ............ G03G 15/20 |
| JP | A-2001-15254 | 1/2001 | |
| JP | A-2004-74609 | 3/2004 | |
| JP | A-2004-314313 | 11/2004 | |
| JP | A-2004-355882 | 12/2004 | |
| JP | A-2009-212483 | 9/2009 | |

* cited by examiner

*Primary Examiner* — David Bolduc
*Assistant Examiner* — Barnabas Fekete
(74) *Attorney, Agent, or Firm* — Oliff PLC

(57) ABSTRACT

A method for manufacturing a sheet heating element includes preparing a sheet member containing a metal or alloy, and performing anodic oxidizing treatment on the sheet member until only a surface layer of the sheet member is oxidized while a center portion thereof is not oxidized.

16 Claims, 6 Drawing Sheets

METHOD FOR MANUFACTURING SHEET HEATING ELEMENT, FIXING DEVICE, AND IMAGE FORMING APPARATUS

CROSS-REFERENCE TO RELATED APPLICATIONS

This application is based on and claims priority under 35 USC 119 from Japanese Patent Application No. 2012-279455 filed Dec. 21, 2012.

BACKGROUND (i) Technical Field

The present invention relates to a method for manufacturing a sheet heating element, a fixing device, and an image forming apparatus.

(ii) Related Art

In the related art, sheet heating elements are used in order to heat the inside of a tubular member of a pipe or the like.

As the sheet heating elements, there is known 1) a sheet heating element having a structure in which a heating element made of a nichrome wire or a stainless steel wire is covered with silicone rubber.

PATENT DOCUMENTS

Patent Document 1: Japanese Patent Application No. 2001-15254 A

Patent Document 2: Japanese Patent Application No. 8-180962 A

Patent Document 3: Japanese Patent Application No. 2004-355882 A

SUMMARY

According to an aspect of the invention, there is provided a method for manufacturing a sheet heating element including: preparing a sheet member containing a metal or alloy; and performing anodic oxidizing treatment on the sheet member until only a surface layer of the sheet member is oxidized while a center portion thereof is not oxidized.

BRIEF DESCRIPTION OF THE DRAWINGS

Exemplary embodiments of the present invention will be described in detail based on the following figures, wherein.

DETAILED DESCRIPTION

Figure 1:
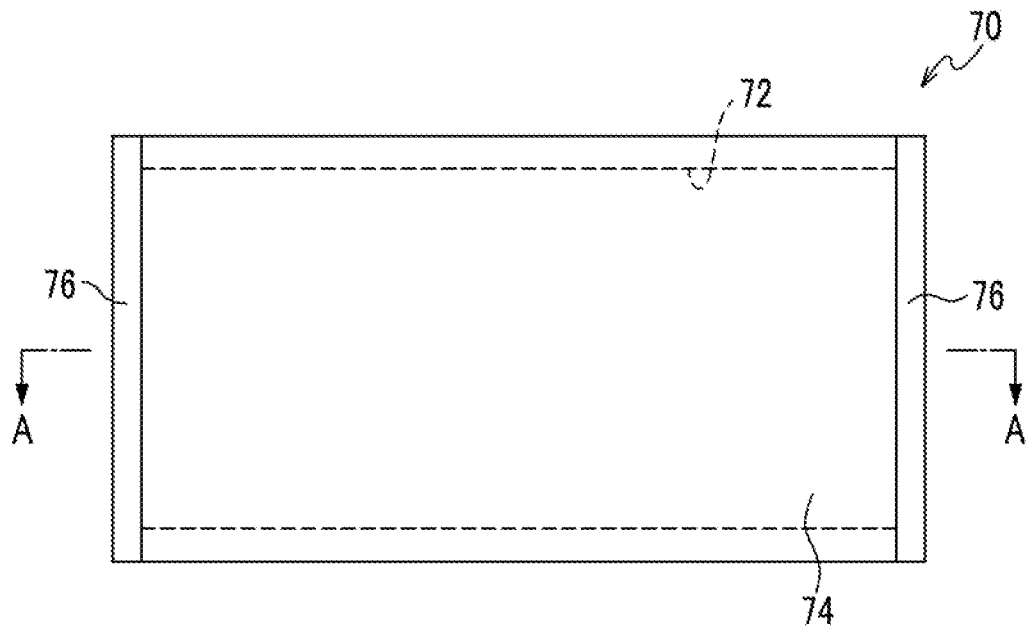
FIG. 1 is a schematic plan view showing an example of a sheet heating element related to the present exemplary embodiment.

An exemplary embodiment that is an example of the invention will be described.

In addition, the same reference numerals may be given to members that have substantially the same functions through all the drawings, and duplicated description may be appropriately omitted.

Sheet Heating Element

Figure 2:
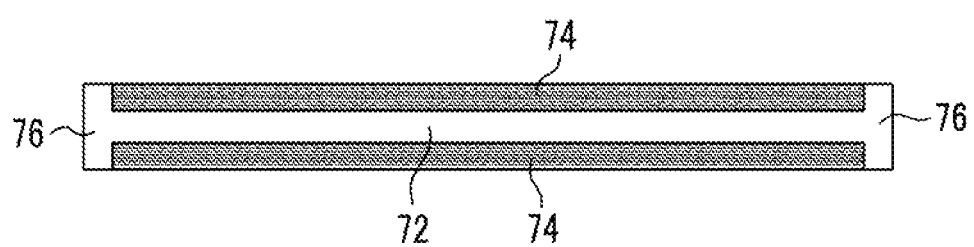
FIG. 2 is a schematic cross-sectional view showing the example of the sheet heating element related to the present exemplary embodiment.

FIG. 1 is a schematic plan view showing an example of a sheet heating element related to the present exemplary embodiment. FIG. 2 is a schematic cross-sectional view showing the example of the sheet heating element related to the present exemplary embodiment. In addition, FIG. 2 is an A-A cross-sectional view of FIG. 1.

A sheet heating element 70 related to the present exemplary embodiment, for example, as shown in FIGS. 1 and 2, has a heating element layer 72, and insulating covering layers 74 that covers the external faces of the heating element layer 72. Two power feeding portions 76 are connected to two facing end portions (for example, longitudinal end portions) of the heating element layer 72. The heating element layer 72 generates heat as electric power is supplied thereto from the power feeding portions 76. In addition, although not shown, connecting terminals made of, for example, stainless steel or the like, may be connected to the power feeding portions 76.

Specifically, for example, the planar shape (shape seen from the thickness direction of the sheet heating element: the same is true hereinbelow) of the heating element layer 72 is constituted by an oblong shape. The insulating covering layers 74 cover faces other than regions connected to the power feeding portions 76 among the external faces (faces that face each other in the thickness direction and side faces that intersect these faces) of the heating element layer 72.

The planar shape of the heating element layer 72 (sheet heating element 70) is not limited to the oblong shape, and, for example, a square shape, a circular shape, a polygonal shape, a belt shape, or the like is selected according to a purpose. Additionally, the planar shape of the heating element layer 72 (sheet heating element 70) may be an aspect in which a linear heating layer is bent or curved and is patterned in the shape of a circuit.

The heating element layer 72 is constituted by a layer (a metal or alloy layer) containing a metal or alloy. However, impurities may be contained in the heating element layer 72.

Examples of the metal or alloy include at least one kind of metal selected from aluminum, titanium, niobium, and tantalum, or an alloy containing the metal.

In addition, the metal or alloy includes a chrome nickel alloy, stainless steel, iron (steel), manganese, a manganese alloy, constantan, a platinum-rhodium alloy, or the like. Among these, the chrome nickel alloy or stainless steel is a heating resistance material that has high resistance and a low temperature coefficient of resistance, and is preferable in that the heating efficiency of the heating element layer 72 becomes high.

The thickness of the heating element layer 72 may be, for example, from 0.1 μm to 50 μm, is desirably from 1 μm to 30 μm, and is more desirably from 5 μm to 20 μm. The thickness of the heating element layer 72 is selected according to, for example, a targeted electric resistance (heating amount).

The insulating covering layers 74 are constituted of layers (metal oxide layers) containing a metal oxide. However, impurities may be contained in the insulating covering layers 74.

The metal oxide includes at least one kind of metal oxide selected from aluminum oxide, titanium oxide, niobium oxide, or tantalum oxide.

In addition, the metal oxide includes iron oxide, nickel oxide, chrome oxide, manganese oxide, cobalt oxide, or the like.

Among these, at least one kind of metal oxide selected from aluminum oxide, titanium oxide, niobium oxide, and tantalum oxide is preferable. This metal oxide is advantageous in that the metal oxide is formed by anodic treatment of a metal.

That is, the metal oxide may be a metal oxide obtained by oxidizing at least one kind of metal selected from aluminum, titanium, niobium, and tantalum or an alloy containing the metal by anodic treatment. The insulating covering layers 74 containing a metal oxide oxidized by anodic treatment easily become dense films. As a result, the flexibility and heat resistance of the sheet heating element 70 improve easily. Additionally, the insulation performance of the heating element layer 72 is secured, and the durability thereof also improves easily.

In addition, although the metal oxide may be 1) a metal oxide obtained by forming the above metal or alloy by forced oxidization under an oxygen-containing atmosphere, 2) a metal oxide obtained by forming the above metal or alloy by chemical treatment (wet type), or the like, the metal oxide formed by anodic treatment is advantageous in terms of the above points.

The thickness of the insulating covering layers 74 may be, for example, from 1 µm to 50 µm, is desirably from 10 µm to 45 µm, and is more desirably from 30 µm to 40 µm. The thickness of the insulating covering layers 74 is selected, for example, from the viewpoints of securing the insulation performance of the heating element layer 72 and the flexibility of the sheet heating element 70.

The power feeding portion 76 are not particularly limited, and is configured containing the same metal or alloy as the heating element layer 72. In addition, the metal or alloy that constitutes the power feeding portions 76 may be a metal or alloy (specifically, for example, a metal or alloy with a low electric resistance value that may supply electric power to the heating element layer 72) that is different from the heating element layer 72.

In the sheet heating element 70 related to the present exemplary embodiment described above, the outer peripheral surface of the heating element layer 72 containing a metal or alloy is covered with the insulating covering layers 74 containing a metal oxide. In this way, in the present exemplary embodiment, a metal oxide having high heat resistance and flexibility is formed in layers to constitute the insulating covering layers 74.

For this reason, the sheet heating element 70 related to the present exemplary embodiment has excellent heat resistance together with flexibility. As a result, even in a case where the sheet heating element 70 is excessively bent, the sheet heating element excessively generates heat, or generation of heat is performed for a prolonged period of time, peeling of the insulating covering layers 74 is suppressed. Additionally, degradation of the insulating covering layers 74 is also suppressed, and insulation and protection of the heating element layer 72 are maintained.

In addition, although the sheet heating elements (for example, Patent Documents 1 to 3) to which the polyimide resin layer with high flexibility is applied are also known as the insulating covering layers 74, in a case where the sheet heating elements excessively generate heat or generation of heat is performed for a prolonged period of time, peeling and degradation of the insulating covering layers 74 occurs easily. On the other hand, although the sheet heating element in which the heating element layer 72 is provided on the glass substrate is also known, the sheet heating element has heat resistance but has no flexibility.

The sheet heating element 70 related to the present exemplary embodiment is used as various heat sources to be utilized in fixing devices for electrophotographic image forming apparatuses, various analysis apparatuses, semiconductor manufacturing equipment, various plants, home electrical appliances, housing equipment, or the like.

Method for Manufacturing Sheet Heating Element

A method for manufacturing the sheet heating element 70 related to the present exemplary embodiment will be described.

First Embodiment

FIGS. 3A to 3D are process views showing an example of the method for manufacturing a sheet heating element related to a first exemplary embodiment. In addition, the process views shown in FIGS. 3A to 3D are process views equivalent to the cross-sectional view shown in FIG. 2.

Figure 3A:
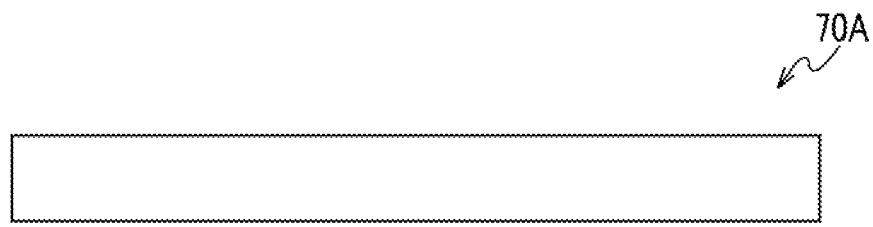
FIGS. 3A to 3D are process views showing an example of a method for manufacturing a sheet heating element related to a first exemplary embodiment.

First, as shown in FIG. 3A, a sheet member 70A containing a metal or alloy is prepared.

The metal, or alloy that constitutes the sheet member 70A includes a metal or alloy that is oxidized by anodic oxidation. Specifically, for example, the metal or alloy includes at least one kind of metal selected from aluminum, titanium, niobium, and tantalum, or an alloy containing the metal.

The planar shape of the sheet member 70A is the same shape as the planar shape of the sheet heating element 70 to be manufactured. The thickness of the sheet member 70A is a thickness (a total value of the thickness of the heating element layer 72 and the insulating covering layers 74) of the sheet heating element 70 to be made. In addition, the sheet member 70A with a targeted thickness is obtained by rolling a metal plate or an alloy plate.

Figure 3B:
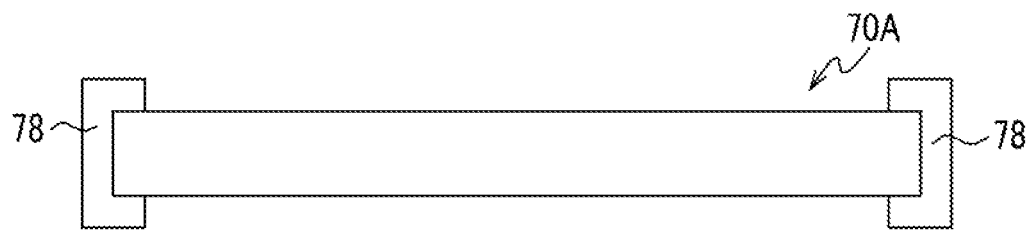

Next, as shown in FIG. 3B, masks 78 are provided on the faces of regions that serve as the power feeding portions 76, among external faces of the sheet member 70A. The masks 78 include, for example, masking tapes.

Additionally, as the masks 78, photosensitive resist films that are patterned by performing exposure and development using photolithography may be used.

Figure 3C:
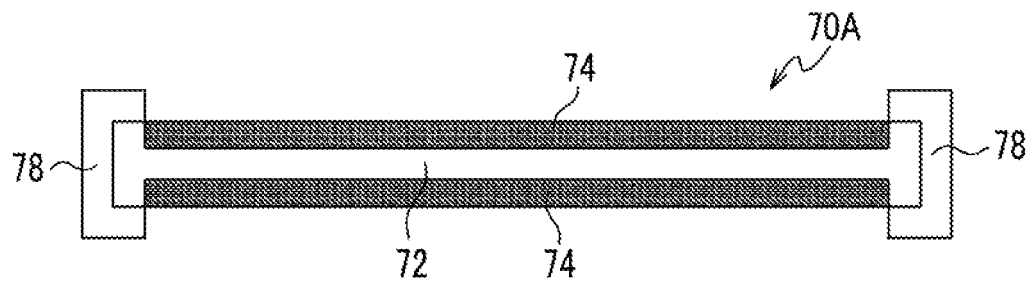

Next, as shown in FIG. 3C, anodic treatment is performed on the external faces of the sheet member 70A on which the masks 78 are provided, the metal, or alloy of surface layer portions of the external faces of the sheet member 70A is oxidized, the external faces of the heating element layer 72 is covered together with the heating element layer 72 containing a metal, and the insulating covering layers 74 containing a metal oxide are formed.

Specifically, metal oxide layers are formed on the surface layer portions of the faces excluding the regions on which the masks 78 are provided, among the external faces (faces that face each other in the thickness direction and side faces that intersect these faces) of the sheet member 70A, for example, by anodic treatment of the sheet member 70A. Then, the formed metal oxide layers are used as the insulating covering layers 74, and the inside of the sheet member 70A that is not oxidized by the anodic treatment is used as the heating element layer 72.

Here, the thickness of the insulating covering layers 74 (metal oxide layers) is determined by the treatment conditions (for example, treatment time or the like) of the anodic treatment. Then, the thickness of the heating element layer 72 is also determined by the treatment conditions (for example, treatment time or the like) of the anodic treatment. Then, the heating resistance of the heating element layer 72 is also determined by the treatment conditions (for example, treatment time or the like) of the anodic treatment.

The anodic treatment of the sheet member 70A is performed by a well-known method. Specifically, the anodic treatment is performed by dipping the sheet member 70A in a treatment bath and giving positive potential to the sheet member 70A in the treatment bath (for example, treatment bath of phosphoric acid, oxalic acid, sulfuric acid, or the like).

The anodic treatment may be performed, for example, under the conditions that the electrolytic concentration of the treatment bath is from 10 mass % to 40 mass %, the temperature of the treatment bath is from 20° C. to 50° C., current density is from 1.0 A/dm$^2$ to 10 A/dm$^2$ voltage is from 30 V to 200 V, and treatment time (electrolysis time) is from 2 minutes to 12 minutes.

Figure 3D:
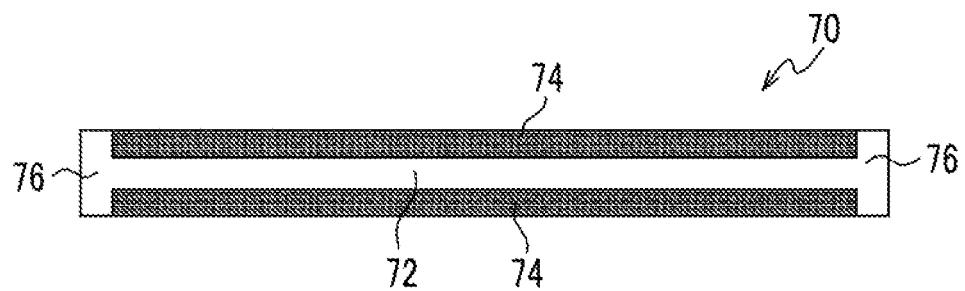

Next, as shown in FIG. 3D, the masks 78 are peeled from the sheet member 70A after the termination of the anodic treatment, and if needed, connecting terminals made of stainless steel or the like are provided on at least portions of the external faces of the regions that serve as the power feeding portions 76 (not shown).

The sheet heating element 70 is obtained through the above processes.

In the method for manufacturing a sheet heating element related to the first exemplary embodiment described above, the sheet member 70A is manufactured through the processes of performing the anodic treatment on the external faces of the sheet member 70A, oxidizing the metal or alloy of the surface layer portions of the external faces of the sheet member 70A, and forming the insulating covering layers 74 that cover the external faces of the heating element layer 72 together with the heating element layer 72.

Thereby, in the method for manufacturing a sheet heating element related to the first exemplary embodiment, the sheet heating element 70 having excellent heat resistance together with flexibility is obtained.

Additionally, in the method for manufacturing a sheet heating element related to the first exemplary embodiment, the insulating covering layers 74 including the metal oxide layers are formed from the sheet member 70A of a single-layer configuration by performing the anodic treatment on the external faces of the sheet member. Therefore, the sheet heating element 70 is obtained in which the adhesion between the insulating covering layers 74 and the heating element layer 72 is also high and the durability is also excellent. In addition, the thickness of the heating element layer 72 is adjusted according to the treatment conditions (for example, treatment time or the like) of the anodic treatment. Therefore, even if patterning the heating element layer 72 to adjust an electric conduction path is not performed, the sheet heating element 70 having targeted heating resistance and having the sheet heating element layer 72 is obtained. That is, the sheet heating element 70 having a plate-shaped heating element layer 72 of which the heating resistance is controlled without patterning the heating element layer 72 is obtained.

Of course, the patterning of the heating element layer 72 is not hindered in the method for manufacturing a sheet heating element related to the present exemplary embodiment. In a case where the heating element layer 72 is patterned, in the stage of anodic treatment, a sheet heating element 70 having a patterned heating element layer 72 is obtained by providing a mask in a region that serves as the heating element layer 72 in a targeted pattern out of both faces that face each other in the thickness direction of the sheet member 70A when the sheet member 70A is viewed in a plan view, performing anodic treatment so that the whole region in the thickness direction excluding the region on which the mask of the sheet member 70A is provided is oxidized (that is, a metal oxide is formed) in that state, and then removing the mask and again performing the anodic treatment so that the surface layer portion of the region on which the mask of the sheet member 70A is provided is oxidized (that is, the layer of a metal oxide is formed). Even in this case, the thickness of the heating element layer 72 may be adjusted by the treatment conditions (for example, treatment time or the like) of the anodic treatment.

Second Embodiment

FIGS. 4A to 4D are process views showing an example of a method for manufacturing a sheet heating element related to a second exemplary embodiment. In addition, the process views shown in FIGS. 4A to 4D are process views equivalent to the cross-sectional view shown in FIG. 2.

Figure 4A:
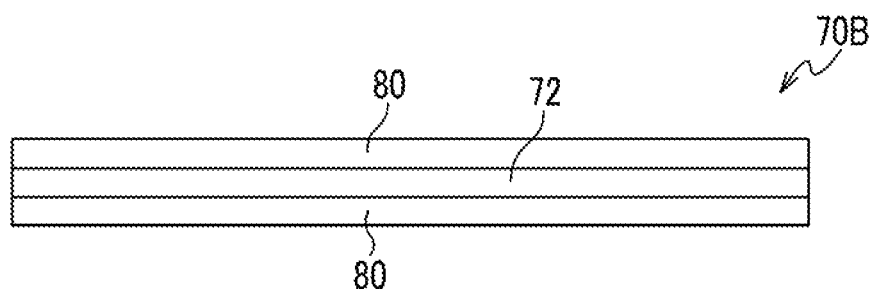
FIGS. 4A to 4D are process views showing an example of a method for manufacturing a sheet heating element related to a second exemplary embodiment.

First, as shown in FIG. 4A, a sheet member (hereinafter referred to as "sheet laminate") 70B, which has the heating element layer 72 containing a metal or alloy, and covering layers 80 that cover the external faces of the heating element layer 72 and contains a metal or alloy, is prepared.

The sheet laminate 70B includes, for example, a sheet laminate obtained by diffusion-joining two sheets of metal or alloy foil that serve as the covering layers 80, with metal or alloy foil serving as the heating element layer 72 interposed therebetween. The sheet laminate 70B is not particularly limited if the sheet laminate has the structure in which two sheets of metal or alloy foil that serve as the covering layers 80 are configured to interpose metal or alloy foil serving as the heating element layer 72 therebetween.

In addition, the sheet laminate 70B may have the structure in which two sheets of metal or alloy foil that serve as the covering layers 80 are directly joined together at the edges of the sheet laminate, and metal or alloy foil serving as the heating element layer 72 is sealed.

The metal or alloy that constitutes the heating element layer 72 includes a metal or alloy that is not oxidized by anodic treatment, and specifically, includes a chrome nickel alloy, stainless steel, iron (steel), manganese, a manganese alloy, constantan, a platinum-rhodium alloy, or the like. Among these, the chrome nickel alloy and stainless steel are favorable from the viewpoint of the heating efficiency of the sheet heating element 70.

The metal or alloy that constitutes the covering layers 80 includes a metal or alloy that is oxidized by anodic oxidation. Specifically, for example, the metal or alloy includes at least one kind of metal selected from aluminum, titanium, niobium, and tantalum, or an alloy containing the metal.

The planar shape of the sheet laminate 70B is the same shape as the planar shape of the sheet heating element 70 to be manufactured. The thickness of the sheet laminate 70B is a thickness that is a thickness (a total value of the thickness of the heating element layer 72 and the insulating covering layers 74) of the sheet heating element 70 to be made.

Figure 4B:
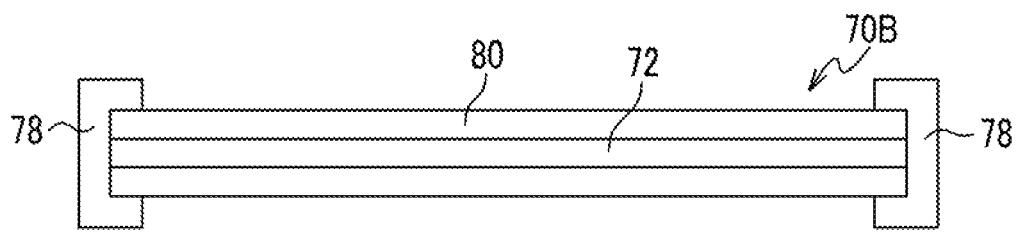

Next, as shown in FIG. 4B, the masks 78 are provided on the faces of regions that serve as the power feeding portions 76, among external faces of the sheet laminate 70B.

The masks 78 are the same as those described in the sheet member 70A related to the first exemplary embodiment.

Figure 4C:
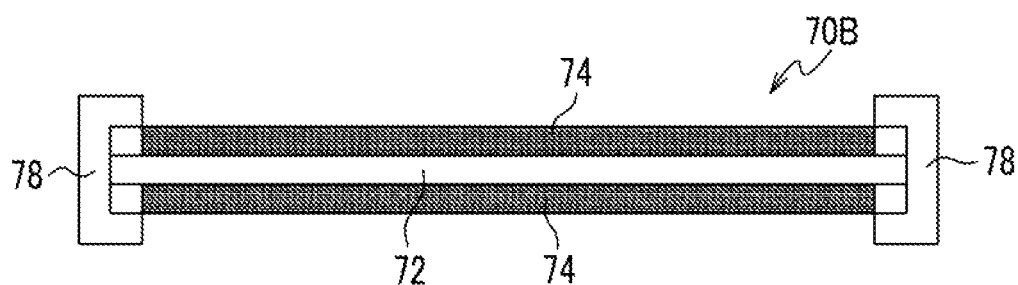

Next, as shown in FIG. 4C, the external faces of the sheet laminate 70B on which the masks 78 are provided, that is, the external faces of the covering layers 80, are subjected to anodic treatment, the metal or alloy of the covering layers 80 is oxidized, and the insulating covering layers 74 containing a metal oxide is formed.

The anodic treatment is the same as that of the description of the sheet member 70A related to the first exemplary embodiment. However, the overall covering layers 80 excluding the regions on which the masks 78 are provided are oxidized by the anodic treatment, and are used as the metal oxide layers.

Figure 4D:
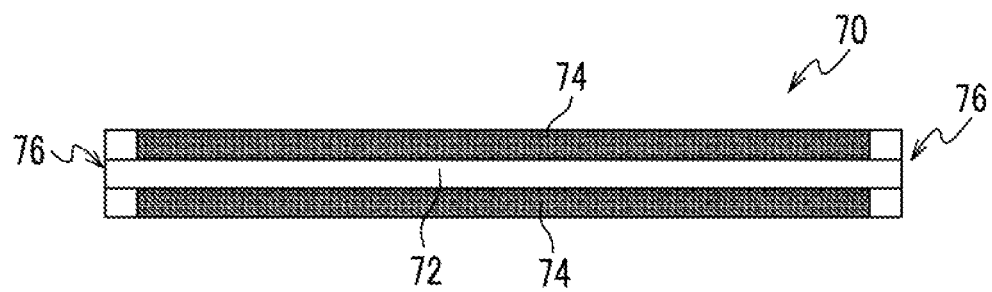

Next, as shown in FIG. 4D, the masks 78 are peeled from the sheet laminate 70B after the termination of the anodic treatment, and if needed, connecting terminals made of stainless steel or the like are provided on at least portions of the external faces of the regions that serve as the power feeding portions 76 (not shown).

The sheet heating element 70 is obtained through the above processes.

In the method for manufacturing a sheet heating element related to the second exemplary embodiment described above, the sheet heating element 70 is manufactured through the process of preparing the sheet member having the heating element layer 72 and the covering layers 80, and the process of performing anodic treatment on the external faces of the covering layers 80 to oxidize the metal or alloy of the covering layer 80, and forming the insulating covering layers 74 containing a metal oxide.

Thereby, in the method for manufacturing a sheet heating element related to the second exemplary embodiment, the sheet heating element 70 having excellent heat resistance together with flexibility is obtained.

Additionally, in the method for manufacturing a sheet heating element related to the second exemplary embodiment, the sheet heating element 70 is manufactured in advance using the sheet laminate 70B having the heating element layer 72. Therefore, the sheet heating element 70 having the heating element layer 72 containing a metal or alloy (specifically, for example, a chrome nickel alloy, stainless steel, or the like that has high resistance and a low temperature coefficient of resistance) that is not oxidized by the anodic treatment is obtained.

Fixing Device

A fixing device related to the present exemplary embodiment has various configurations, for example, includes a first rotary member, a sheet heating element that is provided in contact with the first rotary member and heats the first rotary member, and a second rotary member that is arranged in contact with the external faces of the first rotary member.

The sheet heating element related to the present exemplary embodiment is applied as the sheet heating element.

The fixing device related to the present exemplary embodiment will be described below referring to the drawings.

Figure 5:
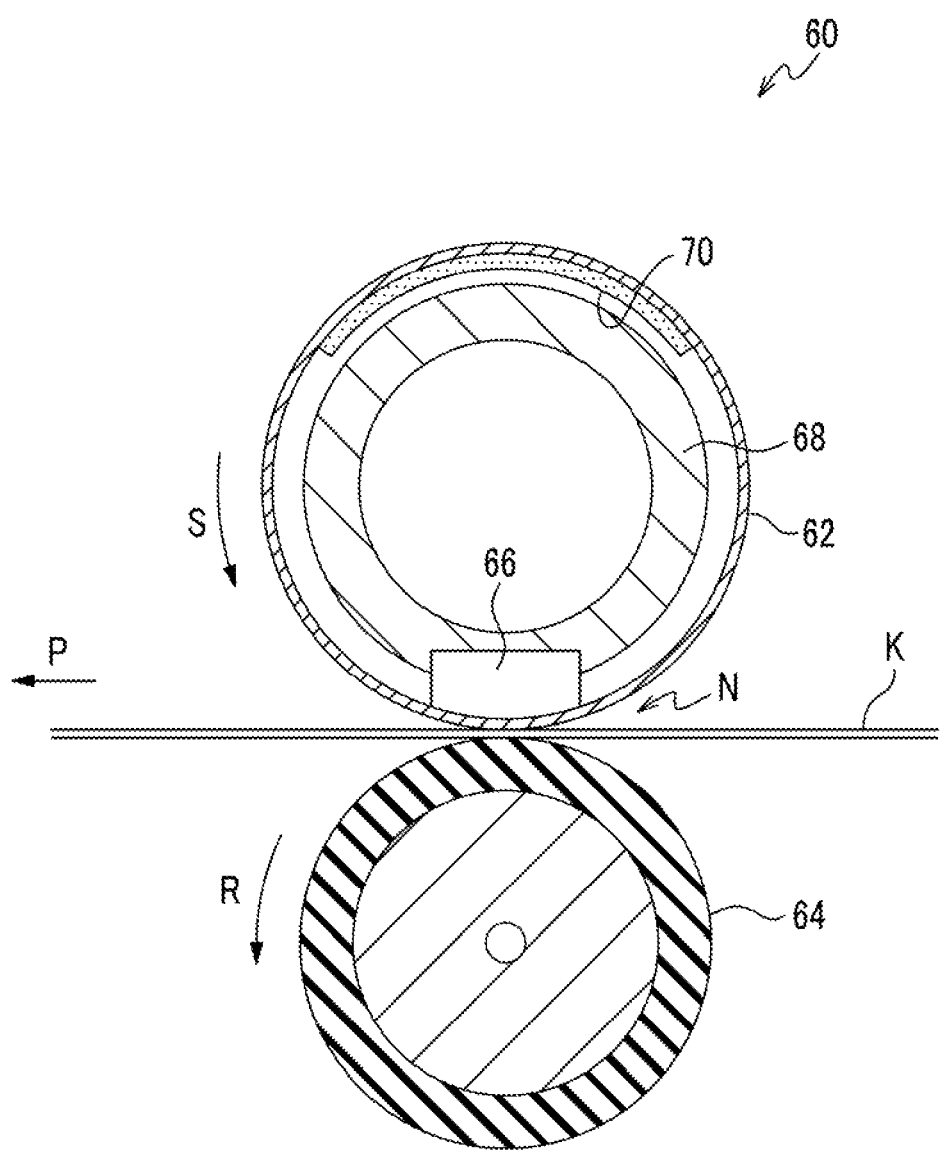
FIG. 5 is a schematic configuration view showing an example of a fixing device related to the present exemplary embodiment.

FIG. 5 is a schematic configuration view showing an example of the fixing device related to the present exemplary embodiment.

A fixing device 60 related to the present exemplary embodiment, as shown in FIG. 5, includes, for example, a heating belt 62 (an example of the first rotary member), a pressurizing roller 64 (an example of the second rotary member) that comes into contact with the outer peripheral surface of the heating belt 62, a pressing pad 66 (an example of a pressing member) that comes into contact with the inner peripheral surface of the heating belt 62 and is arranged at a position that faces the pressurizing roller 64, a supporting member 68 that supports the pressing pad 66, and the sheet heating element 70 that comes into contact with the inner peripheral surface of the heating belt 62 and is provided at a position that faces the pressing pad 66 inside the heating belt 62.

The pressurizing roller 64 is rotated in the direction of arrow R by a driving source (not shown). Additionally, the heating belt 62 and the pressurizing roller 64 comes into contact with each other so that paper K (an example of a recording medium) be inserted therethrough, and the heating belt 62 is rotated in a following manner with the rotation of the pressurizing roller 64 in the direction of arrow R. The pressing pad 66 is arranged at the inner peripheral surface of the heating belt 62 so as to press the surface of the pressurizing roller 64 that comes into contact with the outer peripheral surface of the heating belt 62, to form a nip region N. Additionally, the pressing pad 66 is fixed by the supporting member 68 provided on the inner peripheral surface of the heating belt 62. Additionally, the sheet heating element 70 is provided in a state where the sheet heating element is supported by a supporting member (not shown).

The operation of image fixing by the fixing device 60 will be described.

With the rotation of the pressurizing roller 64 in the direction of arrow R, the heating belt 62 is rotated in a following manner and in the direction of arrow S, and the outer peripheral surface of the heating belt 62 is heated by the sheet heating element 70 that comes into contact with the inner peripheral surface of the heating belt 62.

The heating belt 62 heated in this way is moved to the nip region N by the pressurizing roller 64. On the other hand, the paper K on the surface of which an unfixed toner image (not shown) is provided is transported in the direction of arrow P by a transporting unit (not shown). When the paper K passes through the nip region N, the unfixed toner image (not shown) is heated by the heating belt 62, and is fixed on the surface of the paper K to form a fixed image. The paper K on the surface of which the fixed image is formed is transported in the direction of arrow P by the transporting unit (not shown). The paper is ejected and discharged from the fixing device 60.

Additionally, the region of the heating belt 62, which has finished fixation processing in the nip region N with the rotation of the heating belt 62 and of which the surface temperature of the outer peripheral surface has dropped, moves to a region that comes into contact with the sheet heating element 70, is provided for the next fixation processing, and is heated again.

Image Forming Apparatus

Next, an image forming apparatus related to the present exemplary embodiment will be described.

The image forming apparatus of the present exemplary embodiment includes an image holding member, a charging unit that charges the surface of an image holding member, a latent image forming unit that forms a latent image on the charged surface of the image holding member, a developing unit that develops the latent image with toner to form a toner image, a transfer unit that transfers the toner image to a recording medium, and a fixing unit that fixes the toner image on the recording medium. The fixing device related to the present exemplary embodiment is applied as the fixing unit.

The image forming apparatus related to the present exemplary embodiment will be described below referring to the drawings.

Figure 6:
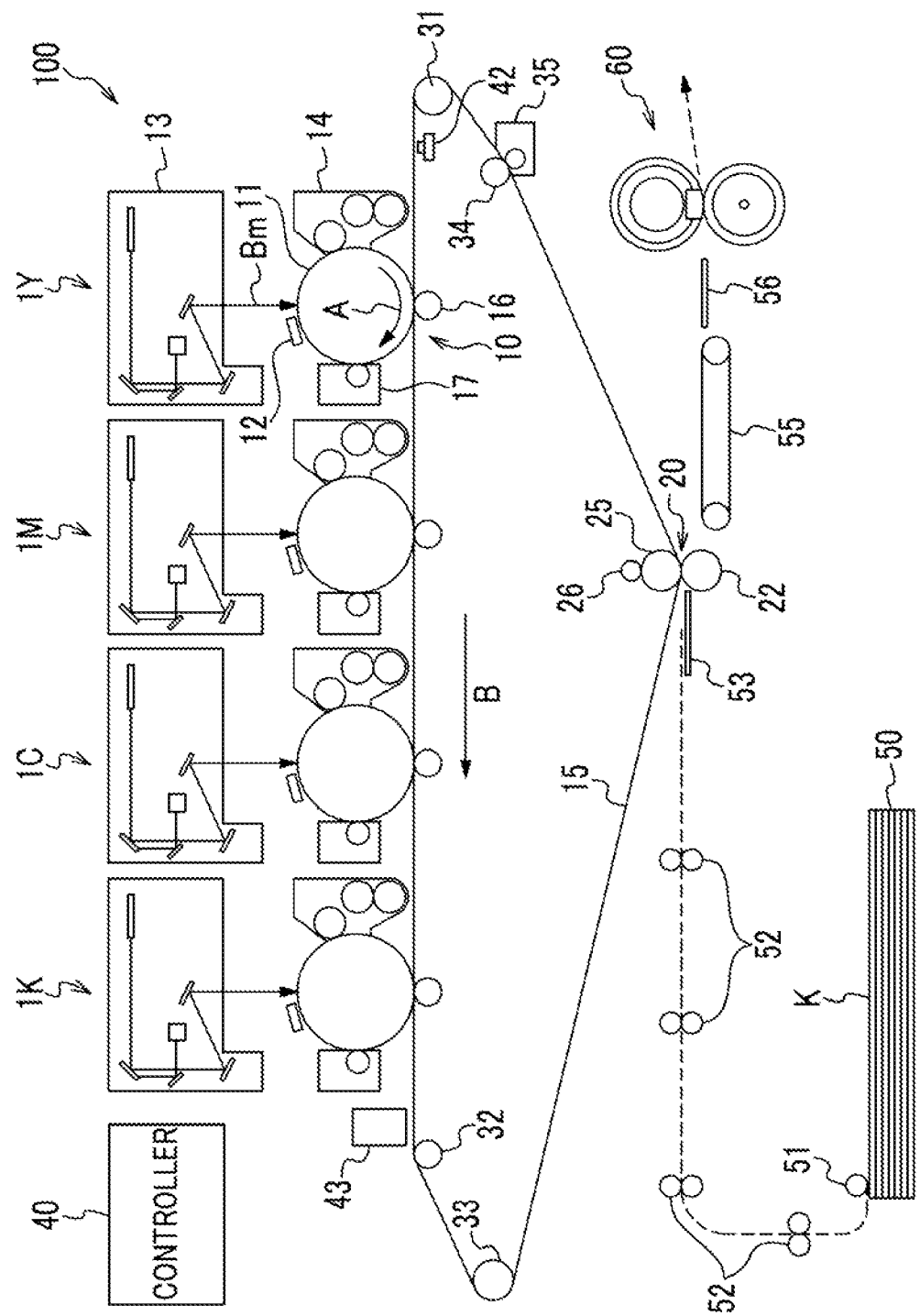
FIG. 6 is a schematic configuration view showing an example of an image forming apparatus related to the present exemplary embodiment.

FIG. 6 is a schematic configuration view showing the configuration of the image forming apparatus related to the present exemplary embodiment.

An image forming apparatus 100 related to the present exemplary embodiment, as shown in FIG. 6, is for example an image forming apparatus of an intermediate transfer type generally called a tandem type, and includes plural image forming units 1Y, 1M, 1C, and 1K where toner images of respective color components are formed by an electrophotographic system, a primary transfer section 10 that sequentially transfers (primarily transfers) the toner images of the respective color components formed by the respective image forming units 1Y, 1M, 1C and 1K to an intermediate transfer belt 15, a secondary transfer section 20 that collectively transfers (secondarily transfers) superposed toner images transferred onto the intermediate transfer belt 15 to the paper K that is a recording medium, and a fixing device 60 that fixes the secondarily transferred image on the paper K. Additionally, the image forming apparatus 100 has a controller 40 that controls the operation of the respective devices (respective sections).

This fixing device 60 is the fixing device 60 related to the second exemplary embodiment as already described. In addition, the image forming apparatus 100 may be a configuration including the fixing device 80 related to the second exemplary embodiment as already described.

Each of the image forming units 1Y, 1M, 1C, and 1K of the image forming apparatus 100 includes a photoconductor 11 that rotates in the direction of arrow A as an example of the image holding member that holds a toner image formed on the surface thereof.

Around the photoconductor 11, a charger 12 that charges the photoconductor 11 is provided as an example of the charging unit, and a laser exposing device 13 (a light beam is designated by symbol Bm in the drawing) that writes an electrostatic latent image on the photoconductor 11 is provided as an example of the latent image forming unit.

Additionally, around the photoconductor 11, a developing device 14 that stores each color component toner and forms the electrostatic latent image on the photoconductor 11 with toner to form a visible image is provided as an example of the developing unit, and a primary transfer roll 16 that transfers each color component toner image formed on the photoconductor 11 to the intermediate transfer belt 15 in the primary transfer section 10 is provided.

Moreover, around the photoconductor 11, a photoconductor cleaner 17 from that residual toner on the photoconductor 11 is removed is provided, and the electrophotographic devices of the charger 12, the laser exposing device 13, the developing device 14, the primary transfer roll 16, and the photoconductor cleaner 17 are disposed sequentially along the rotational direction of the photoconductor 11. The image forming units 1Y, 1M, 1C, and 1K are arranged substantially linearly in order of yellow (Y), magenta (M), cyan (C), and black (K) from the upstream side of the intermediate transfer belt 15.

The intermediate transfer belt 15 that is an intermediate transfer member is constituted of a film-like pressurizing belt that is made to contain a proper amount of antistatic agents, such as carbon black, with resin, such as polyimide or polyamide, as a base layer. The intermediate transfer belt is formed so that the volume resistivity thereof is from $10^6$ Ωcm to $10^{14}$ θcm and the thickness thereof is, for example, about 0.1 mm.

The intermediate transfer belt 15 is circularly driven (rotated) at a predetermined speed in the direction of B shown in FIG. 6 by various rolls. The various rolls includes a driving roll 31 that is driven by a motor (not shown) having an excellent constant speed property, and rotates the intermediate transfer belt 15, a supporting roll 32 that supports the intermediate transfer belt 15 that extends substantially linearly along the array direction of the respective photoconductors 11, a tensioning roll 33 that applies a constant tension to the intermediate transfer belt 15 and functions as a correction roll that prevents meandering of the intermediate transfer belt 15, a back roll 25 that is provided in the secondary transfer section 20, and a cleaning back roll 34 that is provided in a cleaning section that scrapes off residual toner on the intermediate transfer belt 15.

The primary transfer section 10 is constituted of the primary transfer roll 16 that is arranged to face the photoconductor 11 across the intermediate transfer belt 15. The primary transfer roll. 16 is constituted of a shaft and a sponge layer as an elastic layer anchored around the shaft. The shaft is a columnar rod made of a metal, such as iron or SUS. The sponge layer is formed of blend rubber of NBR, SBR, and EPDM in which a conductive agent, such as carbon black, is blended, and is a sponge-like cylindrical roll of which the volume resistivity is from $10^{7.5}$ Ωcm to $10^{8.5}$ Ωcm.

Then, the primary transfer roll 16 is arranged in pressure contact with the photoconductor 11 across the intermediate transfer belt 15, and further, a voltage (primary transfer bias) having a reverse polarity to the charging polarity (referred to as negative polarity; the same applies below) of the toner is applied to the primary transfer roll 16. Thereby, the toner images on the respective photoconductors 11 are sequentially and electrostatically attracted to the intermediate transfer belt 15, and superposed toner images are formed on the intermediate transfer belt 15.

The secondary transfer section 20 is configured to include the back roll 25, and a secondary transfer roll 22 arranged at the toner image holding face of the intermediate transfer belt 15.

The surface of the back roll 25 is made of a tube of EPDM and NBR blend rubber in which carbons are dispersed and the inside thereof is made of EPDM rubber. The back roll is formed so that the surface resistivity thereof is from $10^7 \Omega/\square$ to $10^{10} \Omega/\square$, and the hardness of the back roll is set to, for example, 70° (ASKER C made by Kobunshi Keiki Co., LTD.; the same applies below). The back roll 25 is arranged on the back side of the intermediate transfer belt 15 and constitutes a counter electrode of the secondary transfer roll 22, and a metallic power feeding roll 26 to which a secondary transfer bias is stably applied is arranged in contact with the back roll.

On the other hand, the secondary transfer roll 22 is constituted of a shaft, and a sponge layer as an elastic layer anchored around the shaft. The shaft is a columnar rod made of a metal, such as iron or SUS. The sponge layer is formed of NBR, SBR, and EPDM blend rubber in which a conductive agent, such as carbon black, is blended, and is a sponge-like cylindrical roll of which the volume resistivity is from $10^{7.5}$ Ωcm to $1.0^{8.5}$ Ωcm.

The secondary transfer roll 22 is arranged in pressure contact with the back roll 25 across the intermediate transfer belt 15, and further the secondary transfer roll 22 is grounded, and a secondary transfer bias is formed between the secondary transfer roll and the back roll 25 to secondarily transfer the toner image onto the paper K transported to the secondary transfer section 20.

Additionally, an intermediate transfer belt cleaner 35 that removes residual toner or paper debris on the intermediate transfer belt 15 after the secondary transfer and cleans the surface of the intermediate transfer belt 15 is provided on the downstream side of the secondary transfer section 20 of the intermediate transfer belt 15 in an approachable or separable manner.

In addition, the intermediate transfer belt 15, the primary transfer section 10 (primary transfer roll 16), and the secondary transfer section 20 (secondary transfer roll 22) correspond to an example of the transfer unit.

On the other hand, a reference sensor (home position sensor) 42 that generates a reference signal that serves as a reference for taking an image formation timing in each of the image forming units 1Y, 1M, 1C, and 1K is disposed on the upstream side of the image forming unit 1Y for yellow. Additionally, an image density sensor 43 for performing adjustment of image quality is disposed on the downstream side of the black image forming unit 1K. The reference sensor 42 recognizes a predetermined mark provided on the back side of the intermediate transfer belt 15 to generate a reference signal, and each of the image forming units 1Y, 1M, 1C, and 1K is configured so as to start image formation according to an instruction from the controller 40 based on the recognition of this reference signal.

Moreover, in the image forming apparatus related to the present exemplary embodiment, the transporting unit that transports the paper K includes a sheet accommodating section 50 that accommodates the paper K, a paper feed roll 51 that takes out and transports the paper K accumulated on the sheet accommodating section 50 at a predetermined timing, a transporting roll 52 that transports the paper K delivered by the paper feed roll 51, a transporting guide 53 that feeds the paper K transported by the transporting roll 52 into the secondary transfer section 20, a transporting belt 55 that transports the paper K transported after being secondarily transferred by the secondary transfer roll 22 to the fixing device 60, and a fixing inlet guide 56 that guides the paper K to the fixing device 60.

Next, the basic image forming processing of the image forming apparatus related to the present exemplary embodiment will be described. In the image forming apparatus related to the present exemplary embodiment, image data that is output from an image reader (not shown), a personal computer (PC) (not shown), or the like is subjected to predetermined image processing by an image processor (not shown), and then image forming work is executed by the image forming units 1Y, 1M, 1C, and 1K.

In the image processor, predetermined image processing, such as shading correction, positional deviation correction, lightness/color space conversion, gamma correction, and various types of image editing, such as frame erasing, color editing, and movement editing, is performed on input reflectivity data. The image data subjected to the image processing is converted into color material gradation data of four colors of Y, M, C, and K, and is output to the laser exposing device 13.

In the laser exposing device 13, the photoconductor 11 of each of the image forming units 1Y, 1M, 1C, and 1K is irradiated with, for example, an exposure beam Bm emitted from a semiconductor laser according to the input color material gradation data. In the photoconductor 11 of each of the image forming units 1Y, 1M, 1C, and 1K, the surface of the photoconductor is charged by the charger 12, and the surface is scanned and exposed by the laser exposing device 13 to form an electrostatic latent image. The formed electrostatic latent image is developed as a toner image in each color of Y, M, C, or K by each of the image forming units 1Y, 1M, 1C, and 1K.

The toner image formed on the photoconductor 11 of each of the image forming units 1Y, 1M, 1C, and 1K is transferred onto the intermediate transfer belt 15 in the primary transfer section 10 where each photoconductor 11 and the intermediate transfer belt 15 come into contact with each other. More specifically, in the primary transfer section 10, the voltage (primary transfer bias) having the reverse polarity to the charging polarity (negative polarity) of toner is added to the base material of the intermediate transfer belt 15 by the primary transfer roll 16, and the toner images are sequentially superposed on the surface of the intermediate transfer belt 15 to perform primary transfer.

After the toner images are sequentially primarily transferred to the surface of the intermediate transfer belt 15, the intermediate transfer belt 15 moves and the toner images are transported to the secondary transfer section 20. If the toner images are transported to the secondary transfer section 20, in the transporting unit, the paper feed roll 51 is rotated in accordance with the timing at which the toner images are transported to the secondary transfer section 20, and a predetermined size of paper K is supplied from the sheet accommodating section 50. The paper K supplied by the paper feed roll 51 is transported by the transporting roll 52, and reaches the secondary transfer section 20 through the transporting guide 53. The paper K is stopped once before the paper K reaches the secondary transfer section 20, and the alignment between the position of the paper K and the positions of the toner images is made as a registration roll (not shown) rotates in accordance with the movement timing of the intermediate transfer belt 15 on which the toner images are held.

In the secondary transfer section 20, the secondary transfer roll 22 is pressurized against the back roll 25 through the intermediate transfer belt 15. At this time, the paper K that is transported in accordance with the timing is nipped between the intermediate transfer belt 15 and the secondary transfer roll 22. In that case, if the voltage (secondary transfer bias) of the same polarity as the charging polarity (negative polarity) of toner is applied from the power feeding roll 26, a transfer electric field is formed between the secondary transfer roll 22 and the back roll 25. Then, the unfixed toner images held on the intermediate transfer belt 15 are collectively and electrostatically transferred onto the paper K in the secondary transfer section 20 pressurized by the secondary transfer roll 22 and the back roll 25.

Thereafter, the paper K to which the toner images are electrostatically transferred is transported as it is in a state where the paper is peeled from the intermediate transfer belt 15 by the secondary transfer roll 22, and is transported to the transporting belt 55 provided on the downstream side in the sheet transporting direction of the secondary transfer roll 22. In the transporting belt 55, the paper K is transported to the fixing device 60 in accordance with an optimal transporting speed in the fixing device 60. The unfixed toner images on the paper K transported to the fixing device 60 are fixed on the paper K by receiving fixation processing with heat and pressure by the fixing device 60. The paper K on which a fixed image is formed is transported to a paper ejection accommodating section (not shown) provided in an ejection section of the image forming apparatus.

On the other hand, after the transfer to the paper K is completed, residual toner remaining on the intermediate transfer belt 15 is transported to the cleaning section with the rotation of the intermediate transfer belt 15, and is removed from on the intermediate transfer belt 15 by the cleaning back roll 34 and the intermediate transfer belt cleaner 35.

Although the exemplary embodiment of the invention has been described above, the invention should not be restrictively interpreted as the above exemplary embodiment, various alternations, changes, and improvements may be made, and it is obvious that the invention may be realized within a range that satisfies the requirements for the invention.

EXAMPLES

The invention will be more specifically described below through examples. However, the invention is not limited to the following examples.

Example 1

Preparation of Metal Foil

Sheet Member

Single-layer aluminum foil (sheet member) 150 mm in width×300 nm in length×50 μm in thickness is prepared by rolling an aluminum plate.

Anodic Treatment

Both ends of the obtained single-layer aluminum foil (sheet member) in the longitudinal direction and regions with a width of 10 mm from both the ends are covered and masked with masks. The masked single-layer aluminum foil is dipped within an anodic treatment tank. Then, according to the conditions according to Table 1, anodic treatment is performed, surface layer portions of external faces of the single-layer aluminum foil are oxidized, and aluminum oxide layers with a thickness of 22.5 µm that serve as the insulating covering layers are formed, and an aluminum layer of 5 µm that serves as the heating element layer is internally formed.

Processing of Power Feeding Portions

After the masks are removed from the anodized single-layer aluminum foil and are dried in an atmospheric environment of 300° C., connecting terminals made of stainless steel are welded to power feeding portions that are non-anodic treatment regions from which the masks are removed.

A sheet heating element is obtained through the above processes.

Examples 2 to 12

Sheet heating elements are obtained similar to Example 1 except that sheet members to be prepared and anodic treatment conditions are changed according to Table 1.

Example 13

Preparation of Laminated Metal Foil

Sheet Laminate

Laminated metal foil (sheet laminate) 150 mm in width×300 mm in length×75 µm in thickness is prepared by rolling a laminate (cladding material) in which aluminum foil is diffusion-welded to both faces of nickel chrome alloy foil. In the laminated metal foil, the thickness of a nickel chrome alloy layer that serves as the heating element layer is 15 µm, and the thickness of aluminum layers as the covering layers is 30 µm.

Anodic Treatment Both ends of the obtained laminated metal foil (sheet laminate) in the longitudinal direction and regions with a width of 10 mm from both the ends are covered and masked with masks. The masked laminated metal foil is dipped within an anodic treatment tank. Then, according to the conditions according to Table 1, anodic treatment is performed, surface layer portions (aluminum layers) of external faces of the laminated metal foil are oxidized, and aluminum oxide layers with a thickness of 30 µm that serve as the insulating covering layers are formed.

Processing of Power Feeding Portions

After the masks are removed from the anodized laminated metal foil and are dried in an atmospheric environment of 300° C., connecting terminals made of stainless steel are welded to power feeding portions that are non-anodic treatment regions from which the masks are removed.

Sheet heating elements are obtained through the above processes.

Examples 13 to 15

Sheet heating elements are obtained similar to Example 1 except for being changed to conditions shown in Table 1.

Comparative Example 1

A sheet heating element is obtained by bonding laminated films of a silicone rubber film with a thickness of 300 m and a polyether imide film with a thickness of 100 µm as the insulating covering layers to both faces of stainless steel foil with a thickness of 30 µm as the heating element layer.

Comparative Example 2

A sheet heating element is obtained by pressurizing, heating, and crimping (laminating) laminated films of a thermoplastic polyimide film with a thickness of 50 µm and a non-thermoplastic polyimide film with a thickness of 50 µm as the insulating covering layers to both faces of stainless steel foil with a thickness of 30 µm as the heating element layer.

Evaluation

Heating tests are performed on the sheet heating elements obtained in the respective examples. The results are shown in Table 1.

Heating Test Each of the sheet heating elements obtained in the respective examples is stuck on the surface of a stainless steel pipe ($\phi$50 mm in external diameter×3 mm in thickness×300 mm in length). Another stainless steel pipe ($\phi$54 mm in external diameter×3 mm in thickness×300 mm in length) is put on the pipe on which the sheet heating element is stuck so as to cover the outer peripheral surface of the pipe.

The sheet heating element arranged between these two pipes is energized (voltage=AC 100 V and current=20 A), and heating tests are carried out.

The heating tests are performed in three types of setting including (1) preset temperature of 250° C., (2) preset temperature of 350° C., and (3) preset temperature of 450° C., and the states of the sheet heating element after 1.0 hour has passed (referred to as initial), after 500 hours have passed, and after 1000 hours have passed in each preset temperature are observed, and evaluations are made according to the following evaluation criteria. The evaluation criteria are as follows.

A: No peeling between layers

B: Occurrence of partial peeling between layers (occurrence of partial temperature drop)

C: Occurrence of extensive peeling between layers (occurrence of extensive temperature drop)

D: Occurrence of overall peeling between layers (occurrence of overall temperature drop)

Evaluation of Flexibility

Evaluations of flexibility are performed as follows.

In a state where the sheet heating element 150 mm in width×300 mm in length obtained in each example is made to run along a pipe (external diameter of $\phi$30 mm), a force F that tries to return the sheet heating element to a planar shape is measured using a push-pull gage (spring balance).

The evaluation criteria are as follows.

A: F≤10 gf

B: 10 gf<F≤250 gf

C: 250 gf<F<500 gf

D: F≥500 gf

TABLE 1

| | Prepared sheet member (sheet laminate) | | Anodic treatment conditions | | | | | Configuration of sheet heating element layer (Thickness: μm) Insulating covering layer/heating layer/insulating covering layer |
|---|---|---|---|---|---|---|---|---|
| | Configuration | Thickness (μm) | Treatment bath | Treatment bath temperature (°C.) | Concentration of electrolyte in treatment bath (% by mass) | Current density (A/dm²) | Voltage (V) | Treatment time (min) | |
| Example 1 | Single-layer aluminum foil | 50 | Sulfuric acid | 20 | 10 | 5.0 | 50 | 5.0 | 22.5/5/22.5 |
| Example 2 | Single-layer aluminum foil | 75 | Sulfuric acid | 30 | 20 | 6.0 | 100 | 7.0 | 35/5/35 |
| Example 3 | Single-layer aluminum foil | 100 | Sulfuric acid | 40 | 30 | 7.0 | 200 | 8.0 | 47.5/5/47.5 |
| Example 4 | Single-layer aluminum foil | 75 | Oxalic acid | 50 | 25 | 4.0 | 150 | 10.0 | 35/5/35 |
| Example 5 | Single-layer aluminum alloy (JIS A3003) foil | 75 | Sulfuric acid | 25 | 15 | 6.0 | 70 | 7.0 | 35/5/35 |
| Example 6 | Single-layer aluminum alloy (JIS A5052) foil | 75 | Sulfuric acid | 35 | 25 | 6.5 | 100 | 6.0 | 35/5/35 |
| Example 7 | Single-layer aluminum alloy (JIS A6081) foil | 75 | Sulfuric acid | 45 | 35 | 7.0 | 120 | 6.0 | 35/5/35 |
| Example 8 | Single-layer aluminum alloy (JIS A6051) foil | 75 | Oxalic acid | 50 | 30 | 5.0 | 150 | 11.0 | 35/5/35 |
| Example 9 | Single-layer titanium foil | 75 | Sulfuric acid | 20 | 15 | 7.0 | 30 | 7.0 | 35/5/35 |
| Example 10 | Single-layer niobium foil | 75 | Sulfuric acid | 30 | 25 | 6.5 | 70 | 8.0 | 35/5/35 |
| Example 11 | Single-layer tantalum foil | 75 | Sulfuric acid | 40 | 35 | 8.0 | 170 | 7.0 | 35/5/35 |
| Example 12 | Single-layer titanium foil | 75 | Oxalic acid | 50 | 30 | 5.5 | 100 | 10.0 | 35/5/35 |
| Example 13 | Laminated metal foil of aluminum foil/nickel chrome foil/aluminum foil | 30/15/30 | Sulfuric acid | 25 | 15 | 6.0 | 80 | 6.0 | 30/15/30 |
| Example 14 | Laminated metal foil of aluminum alloy (JIS A6061) foil/nickel chrome foil/aluminum alloy (JIS A6061) foil | 30/15/30 | Sulfuric acid | 35 | 25 | 5.5 | 130 | 6.5 | 30/15/30 |
| Example 15 | Laminated metal foil of aluminum foil/stainless steel foil/aluminum foil | 30/15/30 | Sulfuric acid | 45 | 35 | 6.0 | 180 | 6.0 | 30/15/30 |
| Comparative example 1 | A sheet heating element in which films of a silicon rubber film and a polyetherimide film are bonded to both faces of stainless steel foil is used | | | | | | | | 300/30/100 |
| Comparative example 2 | A sheet heating element in which laminated films of a thermoplastic polyimide film and a non-thermoplastic polyimide film are pressurized, heated, and crimped to both faces of stainless steel foil is used | | | | | | | | 50/30/50 |

TABLE 2

| | Heating evaluation | | | | | | | | |
|---|---|---|---|---|---|---|---|---|---|
| | Setting temperature 250° C. | | | Setting temperature 350° C. | | | Setting temperature 450° C. | | |
| | Initial | After passage of 500 hours | After passage of 1000 hours | Initial | After passage of 500 hours | After passage of 1000 hours | Initial | After passage of 500 hours | After passage of 1000 hours | Flexibility |
| Example 1 | A | A | A | A | A | A | A | A | A | A |
| Example 2 | A | A | A | A | A | A | A | A | A | A |
| Example 3 | A | A | A | A | A | A | A | A | A | B |
| Example 4 | A | A | A | A | A | A | A | A | A | A |
| Example 5 | A | A | A | A | A | A | A | A | A | A |
| Example 6 | A | A | A | A | A | A | A | A | A | A |
| Example 7 | A | A | A | A | A | A | A | A | A | A |
| Example 8 | A | A | A | A | A | A | A | A | A | A |
| Example 9 | A | A | A | A | A | A | A | A | A | B |
| Example 10 | A | A | A | A | A | A | A | A | A | B |
| Example 11 | A | A | A | A | A | A | A | A | A | B |
| Example 12 | A | A | A | A | A | A | A | A | A | B |
| Example 13 | A | A | A | A | A | A | A | A | A | B |
| Example 14 | A | A | A | A | A | A | A | A | A | B |
| Example 15 | A | A | A | A | A | A | A | A | A | B |
| Comparative example 1 | A | A | B | A | B | C | A | C | D | D |
| Comparative Example 2 | A | A | A | A | A | B | A | B | C | C |

It may understood from the above results that the sheet heating elements of the present examples have high flexibility in which each sheet heating element is stuck on a pipe.

Additionally, as for the sheet heating elements of the present example, it may be understood that, compared to the sheet heating element of the comparative example, in the heating tests, occurrence of peeling between layers is suppressed and heat resistance is high.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for manufacturing a sheet heating element comprising:
    preparing a sheet member containing a metal or alloy; and
    performing anodic oxidizing treatment on the sheet member until only an outer surface layer of the sheet member is oxidized while an inner portion of the sheet member is not oxidized, wherein
    the sheet member contains a chrome nickel alloy or stainless steel.

2. The method for manufacturing a sheet heating element according to claim 1,
    wherein the sheet member contains at least one kind of metal selected from aluminum, titanium, niobium, and tantalum or an alloy thereof.

3. A fixing device comprising:
    a first rotary member;
    the sheet heating element according to claim 1 that is provided in contact with the first rotary member and heats the first rotary member; and
    a second rotary member that is arranged in contact with an external face of the first rotary member.

4. An image forming apparatus comprising:
    an image holding member;
    a charging unit that charges a surface of the image holding member;
    a latent image forming unit that forms a latent image on the charged surface of the image holding member;
    a developing unit that develops the latent image with a toner to form a toner image;
    a transfer unit that transfers the toner image to a recording medium; and
    a fixing unit that is the fixing device according to claim 3 that fixes the toner image on the recording medium.

5. The method for manufacturing a sheet heating element according to claim 1,
    wherein a thickness of the outer surface layer is determined by treatment conditions of the anodic oxidizing treatment.

6. The method for manufacturing a sheet heating element according to claim 1, the sheet member having two external faces that face each other in a thickness direction and side faces that intersect both of the external faces.

7. The method for manufacturing a sheet heating element according to claim 1, the sheet member being provided at a position that faces a pressing pad inside a heating belt.

8. A method for manufacturing a sheet heating element comprising:
    preparing a sheet member having an inner sheet heating element layer containing a metal or alloy and an outer covering layer that covers an external face of the inner sheet heating element layer and contains a metal or alloy; and
    performing anodic oxidizing treatment on the outer covering layer while the inner sheet heating element is not oxidized, wherein
    the heating element layer contains a chrome nickel alloy or stainless steel.

9. The method for manufacturing a sheet heating element according to claim 8,
    wherein the outer covering layer contains at least one kind of metal selected from aluminum, titanium, niobium, and tantalum or an alloy thereof.

10. The method for manufacturing a sheet heating element according to claim 8,
    wherein a thickness of the outer covering layer is determined by treatment conditions of the anodic oxidizing treatment.

11. The method for manufacturing a sheet heating element according to claim 8 the sheet member having two external faces that face each other in a thickness direction and side faces that intersect both of the external faces.

12. The method for manufacturing a sheet heating element according to claim 8, the sheet member being provided at a position that faces a pressing pad inside a heating belt.

13. A method for manufacturing a sheet heating element comprising:
    preparing a sheet member containing a metal or alloy;
    performing anodic oxidizing treatment on the sheet member until only an outer surface layer of the sheet member is oxidized while an inner portion of the sheet member is not oxidized; and
    covering a peripheral portion of the sheet member, wherein in the performing anodic oxidizing treatment on the sheet member, the peripheral portion is not oxidized.

14. A method for manufacturing a sheet heating element comprising:
    preparing a sheet member having an inner sheet heating element layer containing a metal or alloy and an outer covering layer that covers an external face of the inner sheet heating element layer and contains a metal or alloy; and
    performing anodic oxidizing treatment on the outer covering layer while the inner sheet heating element is not oxidized; and
    covering a peripheral portion of the sheet member, wherein in the performing anodic oxidizing treatment on the outer covering layer, the peripheral portion is not oxidized.

15. A method for manufacturing a sheet heating element comprising:
    preparing a sheet member containing a metal or alloy; and
    performing anodic oxidizing treatment on the sheet member until only an outer surface layer of the sheet member is oxidized while an inner portion of the sheet member is not oxidized, wherein
    each of two external faces of the sheet member is oxidized while an inner portion of the sheet member is not oxidized.

16. A method for manufacturing a sheet heating element comprising:
    preparing a sheet member having an inner sheet heating element layer containing a metal or alloy and an outer covering layer that covers an external face of the inner sheet heating element layer and contains a metal or alloy; and performing anodic oxidizing treatment on the outer covering layer while the inner sheet heating element is not oxidized, each of two external faces of the sheet member is oxidized while an inner portion of the sheet member is not oxidized.

* * * * *